B. A. WILMOT.
ROAD INDICATOR.
APPLICATION FILED AUG. 2, 1917.
1,336,268.
Patented Apr. 6, 1920.
5 SHEETS—SHEET 1.
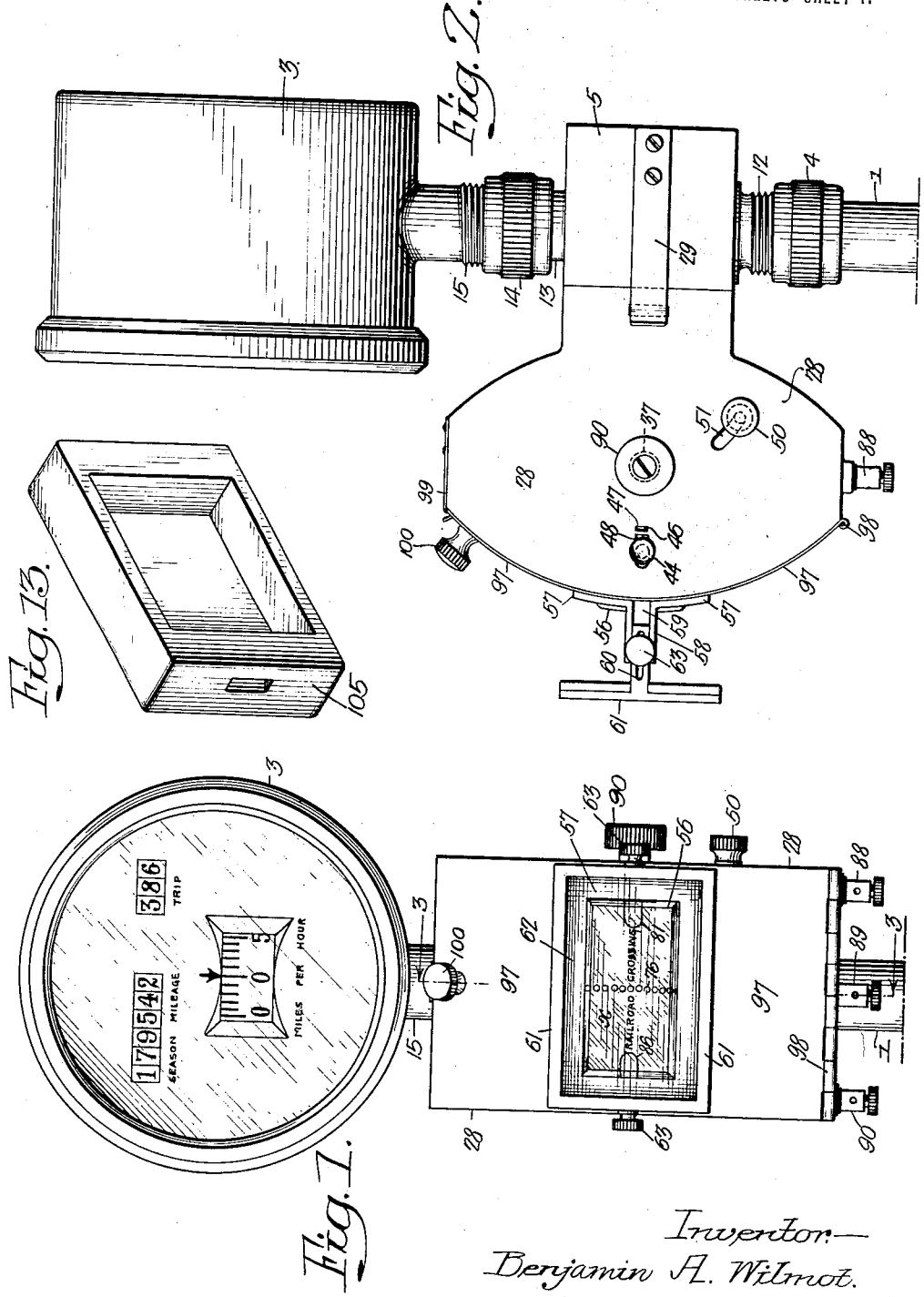
Inventor—
Benjamin A. Wilmot.
by his Attorneys.—
Howson & Howson

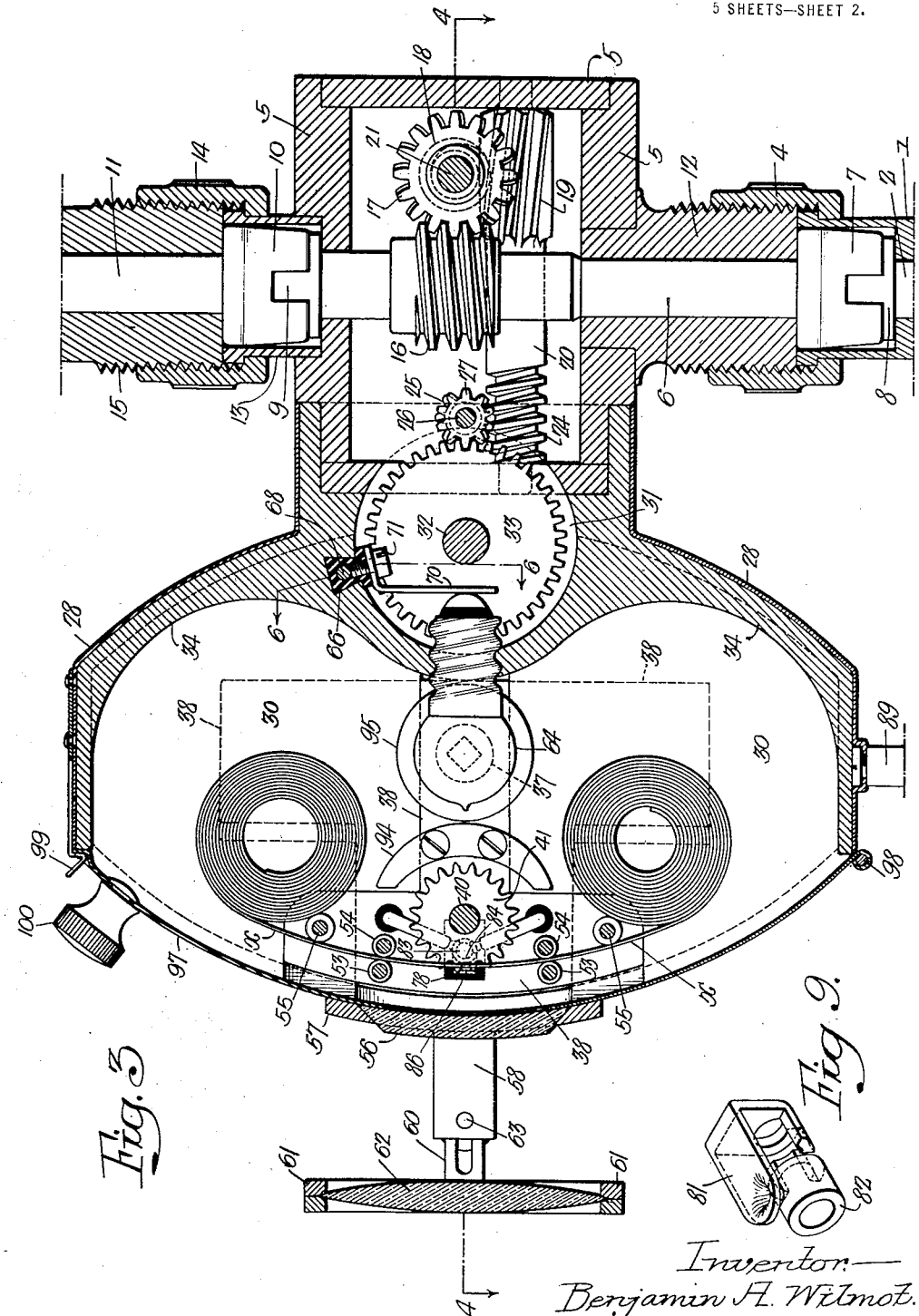

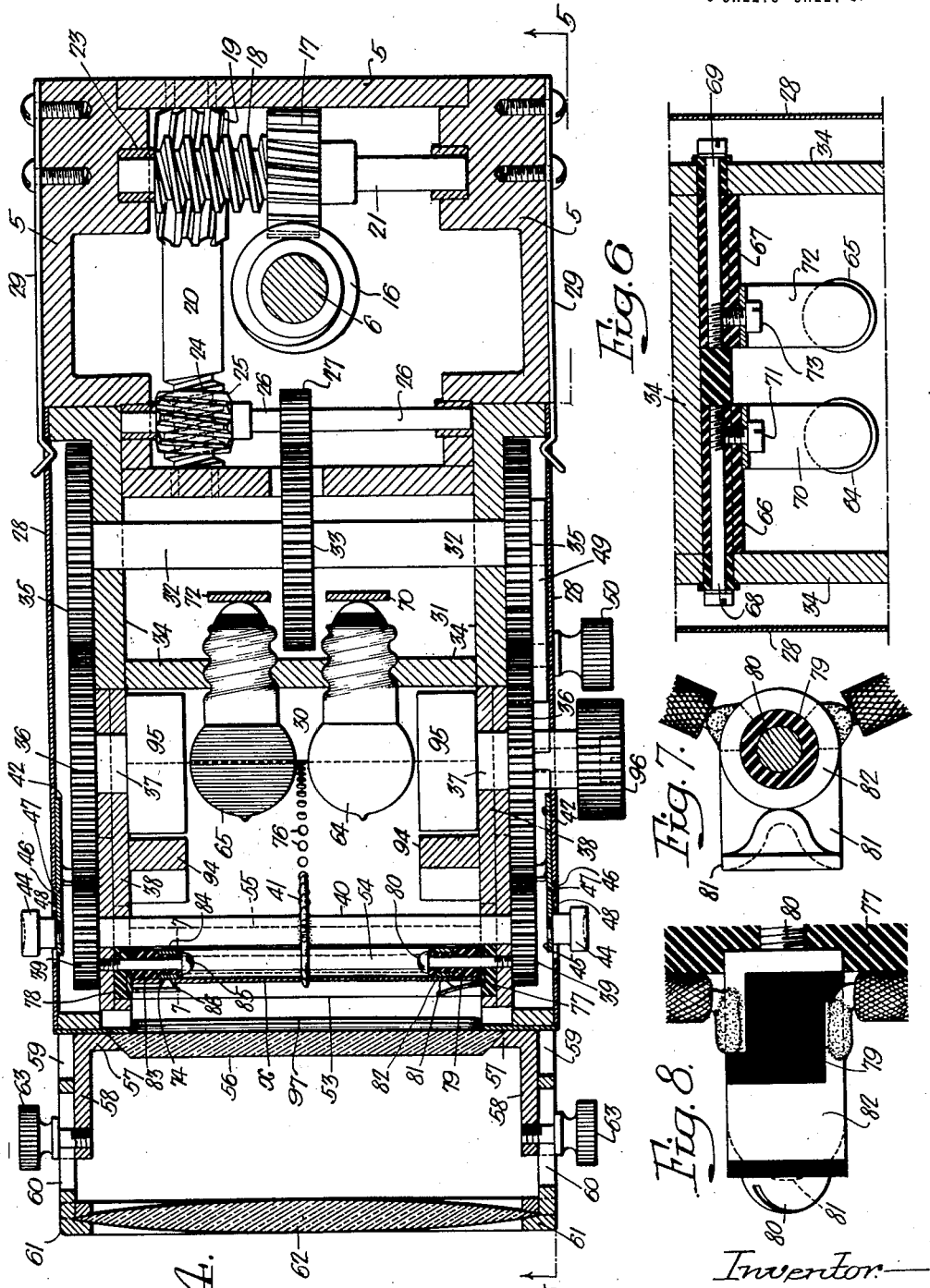

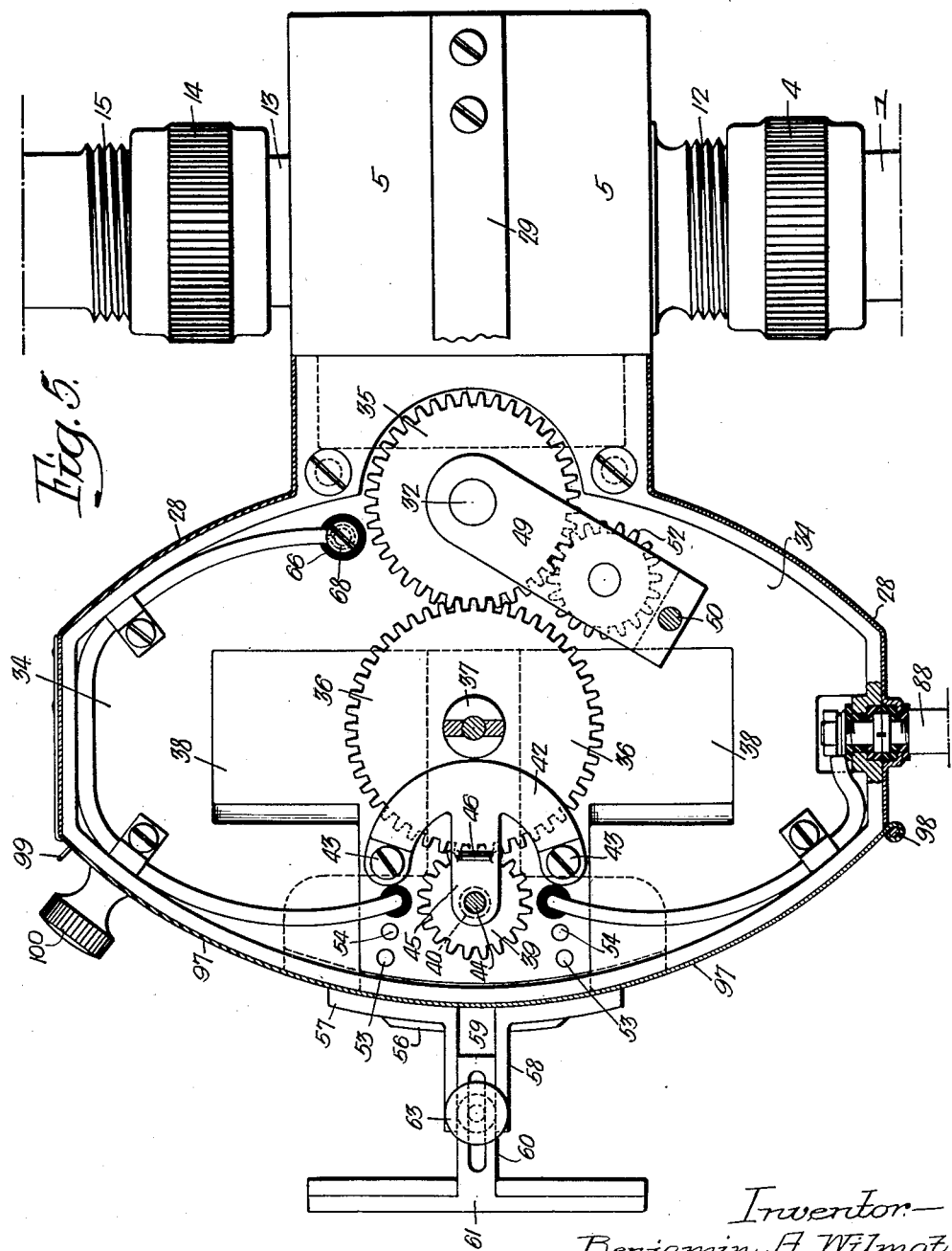

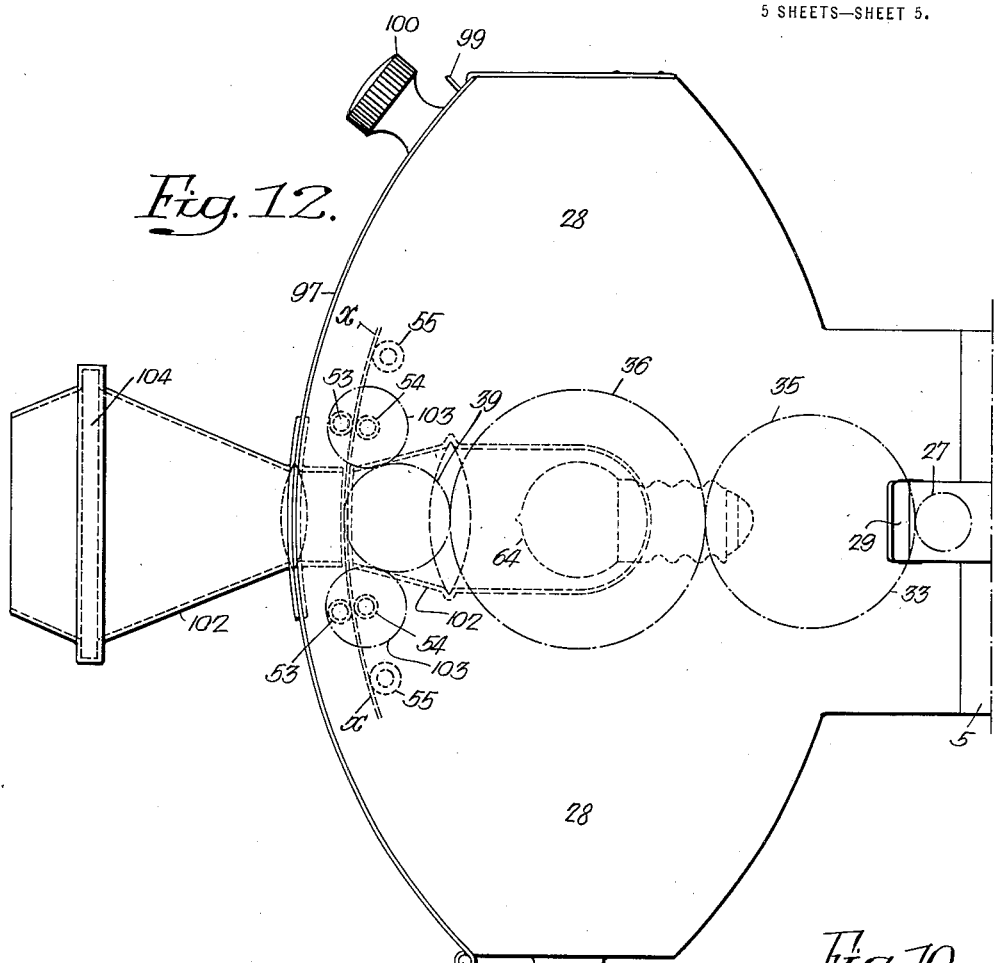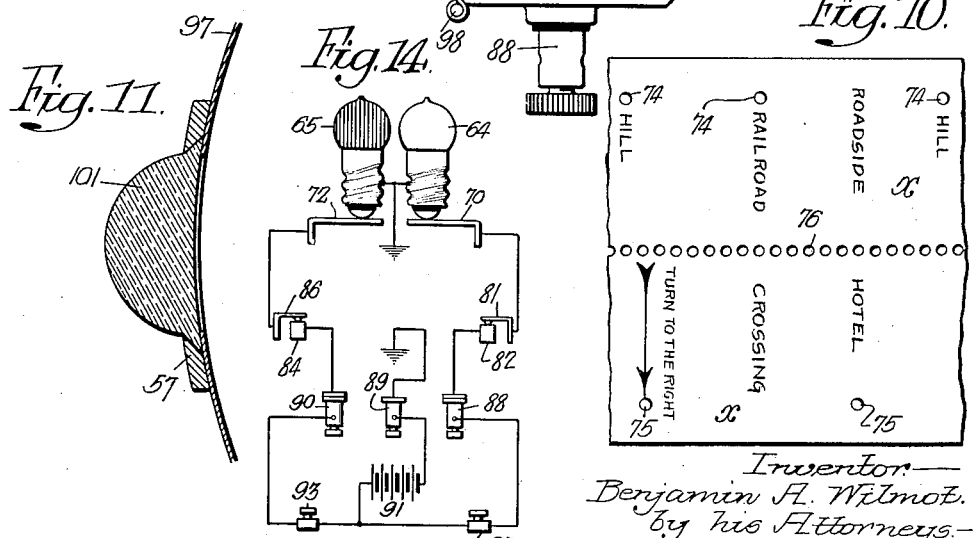

UNITED STATES PATENT OFFICE.

BENJAMIN A. WILMOT, OF CHICAGO, ILLINOIS.

ROAD-INDICATOR.

1,336,268.            Specification of Letters Patent.        Patented Apr. 6, 1920.

Application filed August 2, 1917. Serial No. 184,130.

*To all whom it may concern:*

Be it known that I, BENJAMIN A. WILMOT, a citizen of the United States, residing in Chicago, Cook county, State of Illinois, have invented Road-Indicators, of which the following is a specification.

This invention relates to that class of devices which when mounted upon a motor vehicle and properly connected to one of the wheels thereof, will give visual or other indication of the proximity of certain objects of interest or give directions to be followed on a given route;—one object of the present invention being to provide such a device which shall be simple, substantial and reliable.

I further desire to provide novel means for operatively connecting the road indicating mechanism with the driving shaft of a speedometer, as well as a novel combination and mounting of gears for transmitting motion from said shaft to the indicating mechanism of my apparatus.

Another object of the invention is to provide simple and substantial means for reversing the direction of movement of the indicating strip;—it being also desired to provide novel means for mounting and illuminating the strip so that its indications may be visible at night.

These objects and other advantageous ends I secure as hereinafter set forth, reference being had to the accompanying drawings, in which, Figures 1 and 2 are respectively a front and side elevation illustrating my device as driven from the actuating shaft of a speedometer;

Fig. 3 is a section on the line 3—3, Fig. 1;
Fig. 4 is a section on the line 4—4, Fig. 3;
Fig. 5 is a section on the line 5—5, Fig. 4;
Fig. 6 is a fragmentary section on the line 6—6, Fig. 3;
Fig. 7 is an enlarged transverse section on the line 7—7, Fig. 4;
Fig. 8 is a plan of the structure shown in Fig. 7;
Fig. 9 is a perspective view of certain of the contact structures shown in Figs. 7 and 8;
Fig. 10 is a plan of a part of the strip or ribbon forming part of my invention;
Fig. 11 is a transverse section through a form of magnifying lens which may be used to increase the legibility of the indications of the flexible strip;
Fig. 12 is a side elevation, to some extent diagrammatic, illustrating a modified form of the invention;
Fig. 13 is a perspective view of the cover which may be used to close the gear box when my road indicating device is not attached; and
Fig. 14 is a diagram of the electrical connections forming part of my invention.

In the above drawings 1 represents the tubular casing for the flexible shaft 2 customarily employed to actuate a speedometer 3, for which purpose the casing of the latter is coupled to said shaft casing 1 by a nut 4 and its short shaft section 11 has a head 10 designed to receive the suitably formed head 8 of said shaft 2. In the present form of my invention, I provide a gear box 5 having rotatably mounted within it a shaft section 6 which has one end 7 formed to receive the head 8 of the flexible shaft 2 and having its opposite end 9 formed to enter or operatively connect with the head 10 of the shaft section 11 which drives the mechanism in the speedometer.

For maintaining these parts in operative connection, the gear box 5 is provided with a threaded projection 12 designed to receive the coupling nut 4 and also has a bushing 13 to which is connected a coupling nut 14 formed to screw upon the suitably threaded extension 15 in which the shaft section 11 is journaled. While therefore in the preferred form of my invention the shaft section 6 forms a links interposed in or constituting part of the driving means for a speedometer, it obviously may constitute the end member of the shaft in case the speedometer 3 should be omitted, and it is obvious that the shaft section 11 may be of any desired length so as to permit of the gear box and speedometer being mounted at widely separated points if desired.

Fixed to the shaft section 6 or formed as part of the same is a worm 16 connected through a worm wheel 17 and a worm 18 to a worm wheel 19 and a shaft 20, said elements 17 and 18 being preferably formed as part of a short shaft 21 journaled in the sides of the gear box 3. The shaft 20 extends at right angles to the shaft 6 and has formed on it a worm 24 meshing with a worm wheel 25 on a spindle 26 which also has fixed to it a spur gear 27. Said spur gear is preferably located at about the center of the open top or front side of the gear box 5, which is preferably outwardly flanged and shouldered for the reception of the open rear extension of the casing 28 in which is contained the mechanism of my road indicator.

While this casing may be of any desired form, it preferably has flat sides, a convex open front having a hinged cover 97 and a rearward extension, which as above noted is open so as to removably fit onto the front side of the gear box 5, to which it is held by a pair of spring clips 29 on opposite sides of the latter.

As indicated in Fig. 4, the casing 28 is made of relatively thin sheet material inclosing a casting constituting a frame 34 having a relatively large front chamber 30 and a smaller rear chamber 31. In the side walls of the latter are journaled the ends of a transverse shaft 32 to which is fixed a gear 33 removably meshing with the gear 27 in the gear box, and also having fixed to its opposite ends adjacent the side walls of the frame 34, two other gears 35. These gears respectively mesh with gears 36 journaled on studs or spindles 37, respectively carried by T-shaped plates 38 slidably mounted in suitably formed recesses or guideways of the frame 34 so as to be movable toward and from the gears 35 and thereby permit engagement therewith or disengagement therefrom of the gears 36. The latter are respectively engaged with gears 39 fixed to the ends of a transverse spindle 40, journaled in and connecting the extensions of the plates 38 and having fixed to it a toothed wheel 41.

In order to retain the plates 38 with their gears, etc., in one or the other of their adjusted positions, I provide spring latching devices in the form of semi-annular pieces 42, respectively fixed at their ends to the plates 38 by screws 43 and each having a radial spring tongue 45 lying immediately adjacent and parallel with the inner surface of the casing 28 which is slotted for the passage of headed studs 44 whereby motion may be imparted to said plates 38 and the tongues 45 passed inwardly. Each of said tongues is provided with a projection 46 designed to enter either of two slots 47 or 48 in the sides of the casing 28 so as to hold the movable gearing and other parts carried by the plates 38 in their two adjusted positions.

Loosely mounted on one end of the spindle 32 is a radially projecting arm 49 to whose outer end is fixed a headed stud 50 slidable in a slot 51 of the casing 28. This arm carries a gear 52 at all times in mesh with the gear 35 and capable of being engaged with the gear 36 when this has been disengaged from the gear 35 by the outward movement of the plates 38. As a result of such action it is obvious that the gears 36 and hence the toothed wheel 41 are driven in one direction when said gears engage the gear 35 and is turned in the opposite direction when motion is transmitted to it through the gear 52.

On either side of the toothed wheel 41 is mounted a pair of guide rollers 53 and 54 journaled in the plates 38 whereby a flexible ribbon or strip $x$ is directed toward and from said wheel, and I also provide two other guide rolls 55 on opposite sides of said two pairs of rolls 53 and 54, whereby said strip is compelled to follow a curved course until it is some distance beyond the first guide rolls, when by reason of a set given it during its manufacture, it will automatically roll up in the form of a tight spiral as it is fed through the device.

As shown in Fig. 4, the strip $x$ preferably extends the full width of the space between the two plates 38 and is visible through a window or opening in the cover 97 normally closed by a plate 56 of glass or other transparent material. This is retained in place by a substantially rectangular frame 57 which at its opposite sides is provided with outwardly projecting arms 58 having guideways 59 for the reception of a pair of slotted arms 60 fixed to or formed integral with a frame 61 carrying a magnifying lens 62. The arms 60 are slidable in the guideways 59 so as to vary the distance of the lens from the surface of the strip $x$ and headed studs 63 pass through the slots of said arms into the arms 58 of the frame 57 so as to retain the lens carrying frame in any adjusted position. As a consequence of this arrangement any symbols, printed matter, etc., on the strip or ribbon $x$ are magnified to any desired extent so as to be clearly legible at some distance from the instrument.

The strip or ribbon $x$ is preferably made of translucent or in some cases of transparent material such as celluloid or the like and for illuminating it in order to render its indications visible at night, I mount at least one lamp 64 in a threaded opening of the partition of the frame 34, which being of metal, is thus electrically connected to one terminal of said lamp. In the present instance the latter has a clear glass bulb and in order to give danger warnings or attract particular attention to certain of the indications on the strip or ribbon $x$, I provide in addition a second lamp 65 preferably having red glass and also threaded into the partition of the frame 34 adjacent the lamp 64.

As shown in Fig. 6, I mount suitable plates 66 and 67 of insulating material within the compartment 31 of the frame 34, holding them in place by screws 68 and 69 extending through but insulated from the walls thereof. Mounted on the plate 66 is a spring contact piece 70 held in place by a screw 71 which while threaded into said plate 66, electrically engages the screw 68. This spring contact projects outwardly in the chamber 31 so as to be engaged by the center terminal of the lamp 64 and similarly the center terminal of the lamp 65, is yieldingly engaged by a second spring contact 72 held to the insulating plate 67 by a screw 73, which electrically engages the otherwise insulated screw 69.

In order to govern the supply of current to the lamps and hence the illumination of the strip $x$ thereby, I preferably form this with two sets of openings 74 and 75, in addition to the openings 76 for the reception of the teeth of the propelling wheel 41, forming these openings at points at which it is particularly desired to attract attention of or warn the driver of the vehicle in which my road indicator is mounted. For this purpose I mount on the inner sides of the two plates 38, adjacent the edges of the strip $x$ and between the spindle 40 and the cover glass 56, a pair of insulating pieces 77 and 78 and to the first of these attach a cylindrical supporting structure 79 by means of a screw or bolt 80, clamping between said structure and the piece 77, one end of a spring contact 81.

On the outer part of the insulating structure 79, I mount a metal ring 82 in such position that the contact 81 yieldingly engages it unless the strip or web $x$ is interposed. Similarly I mount on the insulating piece 78, a second cylindrical body 83 of insulating material, carrying on its outer end a contact ring 84 and held in place by a screw or bolt 85. A second spring contact 86 is held in position to yieldingly engage said ring 84 by being clamped between the insulating structures 83 and 78.

Obviously the two structures 79 and 83 serve as supports or guides for the strip $x$, which being of insulating material, ordinarily prevents electrical contact of the rings 82 and 84 by the spring members 81 and 86. The openings 74 and 75 of said strip are however so placed as to pass respectively over the rings 82 and 84 as the strip is moved and when this occurs, it is obvious that the spring contacts 81 and 86 project through said openings and temporarily come into electrical engagement with their rings.

The two lamps 64 and 65 are connected in circuit with the rings 82 and 84 and contacts 81 and 86 as indicated in Fig. 14, there being provided three binding posts 88, 89 and 90 on the bottom of the casing 28, of which the first and last are electrically insulated and connected through suitable conductors with the contacts 82 and 84 respectively. The third binding post 89 is grounded or in electrical connection with the frame of the apparatus and therefore with the threaded terminals of the two lamps 64 and 65. A suitable source of current 91 is connected in circuit with the binding posts and two switches 92 and 93, situated at any convenient points, are also respectively included in the circuits of the binding posts 88 and 90.

As shown in Figs. 3 and 4, I preferably mount two structures 94 and 95 within the central part of the compartment 30 of the casing so as to prevent the spiral coils of the strip $x$ from becoming misplaced or engaging the lamps or the toothed wheel 41. In order to allow of said strip being moved by hand, I attach to one of the gear wheels 36, a headed spindle 96, which projects at one side of the casing 28. The lens 62 with the cover plate 56 and their associated parts are preferably mounted on the casing cover 97 which is hinged to the body of the casing at 98 and is normally held in a closed position by a spring catch 99;—there being provided a knob 100 on said cover adjacent that portion engaged by said catch whereby it may be conveniently manipulated.

The gearing above described connecting the driving shaft section 6 with the toothed wheel 41, is so proportioned that the latter will make a predetermined number of revolutions or if desired, a predetermined fraction of a revolution for each mile traveled by the vehicle on which the device is mounted, with the result that the strip $x$ will be moved a predetermined distance for each mile.

A strip is usually prepared for any particular route to be traveled by being marked at the correct proportional intervals with symbols or printed material, describing features of the scenery, bridges, hotels, crossings, etc., which should be visible at different points along said route, so that if such a strip in the form of a spiral coil be placed in the lower part of the compartment 30 for example, and thereafter be led over the roller 55, between the lower pair of rollers 53 and 54, and thence up over the wheel 41, the teeth of the latter will enter certain of its perforations 76. Said strip is then drawn between the upper pair of rolls 53 and 54 over the roll 55 and is then permitted to assume a substantially cylindrical form serving as a core for the following parts of said strip. Thereafter as the revolution of the toothed wheel 41 feeds the strip upwardly, it will automatically coil upon itself until it is all transferred from the lower to the top part of the compartment 30.

In order to set the strip, the two studs 44 are pressed inwardly and at the same time moved away from the gear box, thereby moving the plates 38 with the gears 36, away from the gears 35. The strip in the form of a roll is placed in the upper part of the chamber 30 and the headed spindle 96 is turned, thereby likewise turning the toothed wheel 41 with which the free end of said strip is now engaged, until the latter, as seen through the lens 62 and cover glass 56, is fed downwardly to a position in which it is properly set at a given starting point so as to thereafter give correct indications of the features of interest, etc., as the vehicle is driven over the predetermined route. Thereafter by disengaging the projections 46 from the recesses of the casing, the gear wheels 36 are again placed in mesh with the gear wheels 35 so that the strip is driven from the shaft section 6.

The openings or holes 75 of the strip x are so placed that when the switch 92 is closed, their passage over the ring 82 will cause the white lamp 64 to be lighted and will thereby render visible the particular symbols or printed matter on the strip, indicating that the vehicle has reached road intersections, hotels, or the like, while the openings 74 are so placed as to permit of the completion of the circuit of the lamp 65 between the contacts 84 and 86 and hence the display of a red light at such other points as railroad crossings, sharp turns, hills or the like, where a danger warning should be given to the driver.

If it should be desired to run back over a given road after having traversed it in one direction, the reverse gear may be thrown into service by moving the gear wheels 36 out of engagement with the gear wheels 35 and thereafter moving the arm 49 until the gear 52 carried thereby meshes with one of the gears 36. Obviously the direction of movement of the strip x is thereby reversed.

If desired, I may substitute for the glass 56, the lens 62 and their associated parts, a cylindrical lens 101, Fig. 11, which will serve to magnify the symbols or printed matter on the strip x so that they are legible at a distance. Again, I may utilize the lamp 64, as shown in Fig. 12, for projecting the symbols or printed matter of the strip onto a suitable screen, and for this purpose I preferably inclose said lamp with a supplementary casing 102, through which the strip x is passed by suitable mechanism, consisting in the case shown, of a pair of gear wheels 103 mounted on the spindles 54 and driven from the gear wheels 39 mounted on stub shafts. Said spindles 54 in this case coact with their associated spindles 53 to positively grip and propel said strip, the toothed wheel 41 and the long transverse spindle 40 being obviously omitted. Within the inclosing casing 102, I mount suitable lenses, together with any suitable form of screen 104 for the reception of the projected image.

If it should be desired, my apparatus may be conveniently removed from the gear box 4 after drawing outwardly the spring catches 99, and said box may thereafter be closed by the application to it of a cover 105, Fig. 13, which is held in place by the same catches. Obviously different strips are employed for different routes and if desired the lamps with their associated electric circuits may be omitted without departing from my invention.

I claim:—

1. The combination of a casing having a window; a flexible indicating strip in the form of at least one spiral roll having a permanent set tending to cause it to assume a spiral roll form as it is unwound from said first roll; means for guiding said strip adjacent said window; and vehicle-actuated driving mechanism including a toothed wheel entering openings in said strip for propelling it past the window and thereafter causing it to independently assume the form of a spiral roll, said wheel being mounted substantially midway between said rolls with substantially equal amounts of the strip between itself and each roll.

2. The combination in a road indicator of a casing having a window; a flexible, permanently set indicating strip in the form of a spiral roll loosely mounted in one part of the casing; means for guiding said strip past the window; and means for causing the strip to pass adjacent the window and thereafter automatically assume the form of a spiral roll in another part of the casing, the same including a toothed wheel engaging said strip immediately to the rear of the window and substantially midway between said rolls.

3. The combination in a road indicator of a supporting structure; a frame movably mounted on said structure; a flexible indicating strip having a permanent set tending to cause it to assume a spiral form; mechanism mounted on said frame for driving said strip; vehicle-actuated mechanism including an element placed to be operatively engaged by the mechanism on the frame when the latter occupies a given position; and a reversing gear adjustable to operatively connect the mechanism on the frame with the vehicle-actuated mechanism when the former occupies a second position.

In witness whereof I affix my signature.

BENJAMIN A. WILMOT.